34. DRYING & GAS OR VAPOR CONTACT WITH SOLIDS.

83

181

EXAMINER

B. R. ANDREWS.

APPARATUS FOR DRYING MATERIAL.

APPLICATION FILED AUG. 31, 1918.

Reissued Oct. 8, 1918.

Re 14,528.

controlled temperature and humidity of different parts

Inventor.
Bernard R. Andrews
by Heard Smith & Tennant
Attys.

THE NORRIS PETERS CO., PHOTO-LITHO., WASHINGTON, D. C.

UNITED STATES PATENT OFFICE.

BERNARD R. ANDREWS, OF BRAINTREE, MASSACHUSETTS.

APPARATUS FOR DRYING MATERIAL.

14,528. Specification of Reissued Letters Patent. Reissued Oct. 8, 1918.

Original No. 1,268,535, dated June 4, 1918, Serial No. 113,349, filed August 5, 1916. Application for reissue filed August 31, 1918. Serial No. 252,269.

*To all whom it may concern:*

Be it known that I, BERNARD R. ANDREWS, a citizen of the United States, residing at Braintree, county of Norfolk, State of Massachusetts, have invented an Improvement in Apparatus for Drying Material, of which the following description, in connection with the accompanying drawing, is a specification, like characters on the drawing representing like parts.

This invention relates to drying apparatus of that type including an elongated drying chamber or tunnel through which the material to be dried passes from one end to the other and means to cause a drying air current to pass through the tunnel thereby to effect the drying of the material. One of the objects of the invention is to provide a novel drying apparatus of this type which is so constructed as to effect an even drying of the material and which is also so constructed that the drying air current can be maintained in any desired predetermined condition as respects humidity and temperature at any predetermined point in the tunnel.

In the ordinary tunnel drying apparatus the material to be dried is conveyed through the tunnel to one end thereof and the drying current of air is caused to be passed through the tunnel generally in the direction opposite to that in which the material moves. It has also been proposed to so construct the tunnel that the air current in its movement from one end to the other of the tunnel will cross back and forth transversely across the tunnel so as to effect a more even drying of the material.

In drying some materials best results can be secured by maintaining the air in a predetermined condition at various predetermined points along the length of the tunnel. For instance, for drying some materials, it may be desirable to provide a drying current of air which has a progressively-decreasing humidity from one end to the other of the tunnel so that the humidity of the air will be greatest at the end of the tunnel where the material enters, and will be least at the end where the material is delivered, while in drying other materials best results may be secured by maintaining the humidity of the drying current of air at a substantially uniform point throughout the tunnel. Again, for drying still other materials best results may be obtained by having different predetermined temperatures at different points along the length of the tunnel.

My invention is designed to provide a drying apparatus of the tunnel type which is constructed so that the desired predetermined condition of the drying current of air may be maintained at any particular point along the length of the tunnel. This is accomplished by introducing heating devices and humidifying devices at such places in the length of the tunnel as necessary to properly condition the air at any point therein.

The invention is shown in connection with a tunnel having means for causing the air to pass transversely across said tunnel a plurality of times during its passage through said tunnel. My improved drying apparatus is capable of use for drying any sort of material, and although I have illustrated herein an installation which is best adapted for drying some particular materiels, yet the principle of the invention is applicable to drying apparatus designed for drying any material.

In order to give an understanding of my invention, I have illustrated in the drawings more or less diagrammatically a drying apparatus designed to dry articles which may be carried through the tunnel on trucks.

Figure 1:
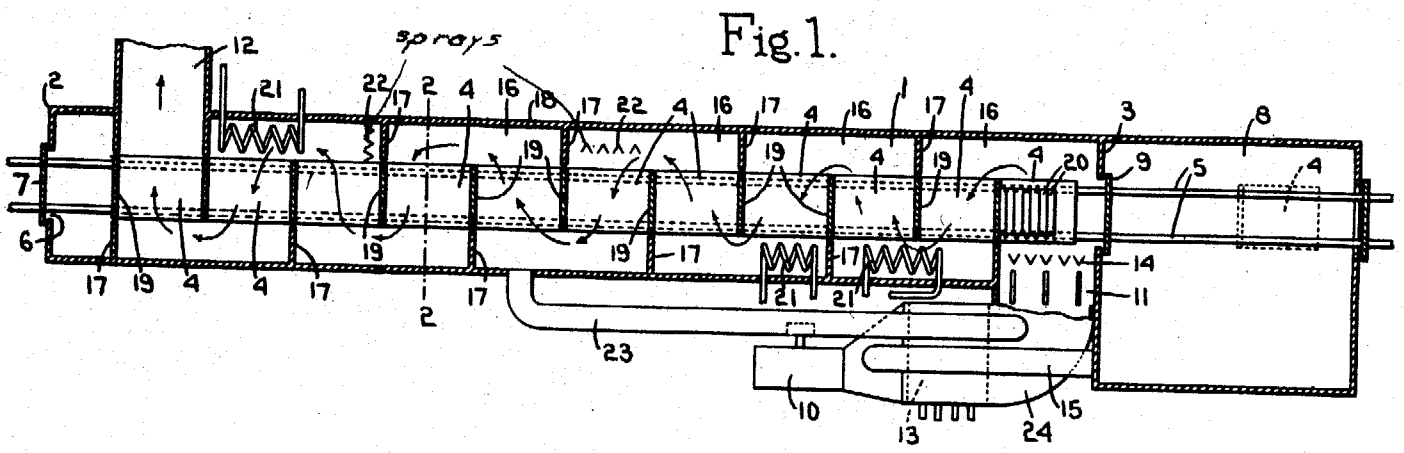
Figure 1 is a horizontal section of a drying apparatus of the above type.
Figure 3:
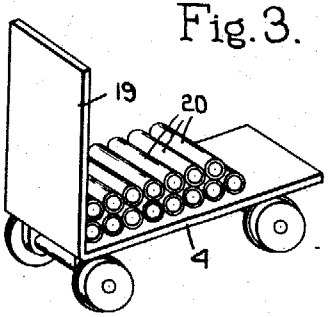
Fig. 3 is a perspective view of one of the trucks employed partially loaded.
Figure 2:
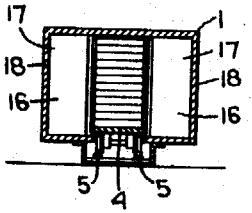
Fig. 2 is a section on the line 2—2, Fig. 1.

1 indicates the tunnel or drying chamber through which the material to be dried is passed. This tunnel is constructed to receive the material to be dried at the left-hand end 2 thereof and to deliver said material from the right-hand end 3 thereof. The drying air current is caused to traverse the tunnel from one end to the other, and in the embodiment herein shown, it is introduced into the tunnel at the right-hand end 3 thereof and passes through the tunnel to the left-hand end 2 thereof. Any suitable means may be employed for conveying the material to be dried through the tunnel. As illustrating one form of conveyer I have shown a plurality of trucks 4 adapted to run on tracks 5 extending through the tunnel. The tunnel is herein shown as provided with an opening 6 in its entering end through which the trucks 4 may be introduced into the tunnel, and this opening may be closed by a suitable door 7. At the delivery end of the tunnel I have shown a receiving chamber 8 into which the trucks may be received, said chamber being separated from the tunnel by a movable door 9. The drying air current may be forced through the tunnel in any suitable way. I have shown for this purpose a blower or force fan 10 which delivers the air current into the tunnel 3 through the inlet port 11. At the other end of the tunnel is an outlet or discharge opening 12 through which the drying air current is discharged. 13 is a heater over which the air is forced before it is delivered to the tunnel and by which the drying air current is brought to the desired temperature, and 14 indicates diagrammatically a humidifying apparatus in the form of spray nozzles by which the air may be brought to the proper humidity as it is introduced into the tunnel. The blower 10 is connected to the chamber 8 by a by-pass pipe 15 so that the pressure in the chamber 8 will be maintained the same as that in the tunnel, the purpose of this being so that when the door 9 is opened to permit a truck 4 to be discharged, this operation will not change the pressure in the tunnel or disturb the movement of the drying air current therethrough.

The tunnel herein shown is of that type which is provided with means for causing the air current to pass back and forth transversely across the material to be dried as said current progresses from one end of the tunnel to the other thereby to assist in producing an even drying of material. This is accomplished by providing a plurality of pockets 16 in each of the two opposite sides of the tunnel and also providing means to cause the air to pass from the pockets on one side to the pockets on the other side alternately as it progresses through the tunnel. This carries the air current in a zig-zag manner back and forth across the material to be dried. In the illustrated embodiment of my invention these pockets 16 are located on the two vertical sides of the tunnel and they are formed by the vertical transversely-extending baffle plates or partitions 17 which extend inwardly from the side walls 18 of the tunnel. These baffle plates preferably extend from the top to the bottom of the tunnel and the baffle-plates on opposite sides of the tunnel have a staggered relation to each other. The baffle-plates on one side of the tunnel are separated from those on the other side by a space sufficient to permit the trucks 4 or other conveyer device to pass between them. Each pocket on one side of the tunnel will, therefore, overlap two pockets on the opposite side of the tunnel.

Associated with the baffle-plates 17 by which the pockets are formed is suitable means to compel the air current to travel directly from a pocket on one side of the tunnel across the conveyer to a pocket on the other side of the tunnel and thence to travel from said last-named pocket directly back across the tunnel again to the next adjacent pocket on the first side of the tunnel, etc. Any means capable of securing this zig-zag movement of the air may be employed, depending upon the character of the material to be dried and on the character of the conveyer for conveying the material through the tunnel. In the illustrated embodiment of my invention this means is in the form of partitions 19 carried by the trucks 4, each partition 19 extending from the top to the bottom of the tunnel and having a width equal to that of the truck. The trucks are of such a length relative to the distance between the baffle-plates 17 that when the tunnel is filled with trucks placed closely together a partition 19 will come opposite each of the baffle-plates 17, as clearly seen in Fig. 1, said partitions 19 thus forming continuations or extensions of the baffle-plates 17. With this construction it will readily be seen that as the drying air current is forced through the tunnel from one end to the other, it will be compelled to take the zig-zag course indicated by the arrows in Fig. 1, said current passing from each pocket 16 transversely across a truck and around the partition 19 thereon into a pocket on the opposite side of the tunnel, and then from said pocket back across the next truck 4 into another pocket on the first named side of the tunnel and thence around the partition 19 on said latter truck and back across the next truck into a pocket on the other side of the tunnel, etc. By this means the drying air current is compelled to take a zig-zag course back and forth across the trucks and the material thereon to be dried.

In using a tunnel of this nature, the trucks are introduced into the tunnel, as shown, and at suitable intervals of time the row of trucks is advanced the length of one truck, the truck at the right hand end of the tunnel being removed and a new truck being introduced at the left-hand end. Each time that the row of trucks is advanced the direction of the drying current of air transversely across the material on each truck is reversed so that in passing through the tunnel the material on each truck is subjected to transverse air currents first in one direction and then in the other. For instance, in the drawing the truck at the right-hand end of the tunnel has the air current passing from the bottom to the top, while the second truck has the air current passing from the top to the bottom of Fig. 1, etc. When the trucks are advanced, then what is now the second truck in Fig. 1 will become the first truck and the air current will then be moving across said truck in the opposite direction from that indicated in Fig. 1. By thus reversing the direction of the air current transversely across the various trucks an even drying of the material on the trucks is obtained. In the drawings the material to be dried is shown in the form of tubes 20, but these are merely used for illustrative purposes only.

In order to maintain a proper condition of the drying air current at various points along the length of the tunnel, I propose to use heaters 21 (herein illustrated diagrammatically as heating coils) for controlling the temperature of the air and humidifiers or spray devices 22 at suitable points for controlling the humidity of the air. These heaters 21 and humidifiers or spray devices 22 may be placed in the various pockets 16 at any desired points along the length of the tunnel, depending upon the particular condition desired in the air at any particular point. The spray devices may be used either to increase or to decrease the humidity of the air for by spraying a mist of tempered moisture into the air the humidity of the air will be increased, while if the spray devices are used to spray cold water into heated air the consequent cooling of the air will cause condensation of moisture therein and a lowering of the humidity. The heating devices may be used in usual way for controlling the temperature of the air. With this arrangement, therefore, it is possible to control the humidity and the temperature of the air independently at predetermined points in the tunnel so that any desired condition of the air as regards humidity and temperature may be provided at any point.

I have also shown a by-pass pipe 23 which may be taken off from the connection 24 between the blower and the tunnel and led into the tunnel at any desired point for the purpose of further controlling the condition of the air at such point.

From the above it will be seen that my invention involves a tunnel having provision for conveying therethrough the material to be dried, and also having means for causing a drying air current to pass through said tunnel, in combination with means to vary the condition of the air as regards humidity or temperature or both at predetermined points along the tunnel.

While I have herein shown an apparatus in which the drying air current passes through the tunnel in a direction opposite to that in which the material to be dried passes, yet this relative direction of movement between the material to be dried and the drying air current is not essential, the main thing being the means for controlling the condition of the air at different points in the tunnel.

I claim:

1. In a drying apparatus, the combination with a drying tunnel having provision for conveying therethrough the material to be dried, of means to cause a drying current of air to pass through the tunnel, regulatable heating devices located at various points in the tunnel, and regulatable spray devices also located at various points in the tunnel whereby the humidity and the temperature of the air in the tunnel may be independently controlled.

2. In a drying apparatus, the combination with a drying tunnel having provision for conveying therethrough the material to be dried, of means to cause a drying current of air to pass through the tunnel, and means to control the humidity and temperature of the air independently at predetermined points in the tunnel.

3. In a drying apparatus, the combination with a drying tunnel having provision for conveying therethrough the material to be dried, of means to cause a current of air to pass through the tunnel, a chamber communicating with the discharge end of the tunnel and into which the material is discharged from the tunnel, and means to maintain approximately the same air pressure in said chamber as exists at the discharge end of the tunnel.

4. In a drying apparatus, the combination with a tunnel having provision for conveying therethrough the material to be dried, of a chamber communicating with the discharge end of the tunnel, a fan connected to the tunnel near the discharge end and by which a drying current of air is forced through the tunnel in a direction opposite to that in which the material to be dried passes therethrough, and means connecting said fan with the chamber whereby the air pressure in the chamber is maintained approximately the same as that at the discharge end of the tunnel.

In testimony whereof, I have signed my name to this specification.

BERNARD R. ANDREWS.

Copies of this patent may be obtained for five cents each, by addressing the "Commissioner of Patents, Washington, D. C."